United States Patent
Wahbo

(10) Patent No.: US 11,943,200 B2
(45) Date of Patent: Mar. 26, 2024

(54) SYSTEMS AND METHODS FOR DETECTING ANOMALOUS VIRTUAL PRIVATE NETWORK SESSIONS USING MACHINE LEARNING

(71) Applicant: Saudi Arabian Oil Company, Dhahran (SA)

(72) Inventor: Faisal Talal Wahbo, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 357 days.

(21) Appl. No.: 17/203,048

(22) Filed: Mar. 16, 2021

(65) Prior Publication Data
US 2022/0303247 A1   Sep. 22, 2022

(51) Int. Cl.
  *H04L 9/00* (2022.01)
  *G06N 3/04* (2023.01)
  *H04L 9/40* (2022.01)

(52) U.S. Cl.
  CPC ........... *H04L 63/0272* (2013.01); *G06N 3/04* (2013.01); *H04L 63/0876* (2013.01); *H04L 63/1416* (2013.01); *H04L 63/1425* (2013.01); *H04L 63/20* (2013.01)

(58) Field of Classification Search
  CPC ............ H04L 63/0272; H04L 63/0876; H04L 63/1416; H04L 63/1425; H04L 63/20; H04L 63/08; G06N 3/04; G06N 3/045; G06N 3/08
  See application file for complete search history.

(56) References Cited

U.S. PATENT DOCUMENTS

| | | | |
|---|---|---|---|
| 9,215,244 B2 | 12/2015 | Ayyagari et al. | |
| 9,537,880 B1 | 1/2017 | Jones et al. | |
| 10,003,607 B1* | 6/2018 | Kolman | H04L 63/1408 |
| 10,341,372 B2 | 7/2019 | Chari et al. | |
| 10,341,391 B1* | 7/2019 | Pandey | H04L 67/14 |
| 2017/0063909 A1 | 3/2017 | Muddu et al. | |

OTHER PUBLICATIONS

Gao, Ping, et al. "VPN traffic classification based on payload length sequence." 2020 International Conference on Networking and Network Applications (NaNA). IEEE, 2020. (Year: 2020).*

Borkar, "Securing Your Remote Workforce, Par 2: Detecting Unusual VPN Access and Best Practices to Secure VPN Services," Information Security, Exabeam, Mar. 2020, 13 pages.

* cited by examiner

*Primary Examiner* — Daniel B Potratz
*Assistant Examiner* — Syed M Ahsan
(74) *Attorney, Agent, or Firm* — Fish & Richardson P.C.

(57) ABSTRACT

A virtual private network (VPN) security system obtains data regarding a VPN session including (i) for each of a plurality of first subnets, a number of allowed connection attempts by a computer system to that first subnet, (ii) for each of a plurality of second subnets, a number of blocked connection attempts by the computer system to that second subnet, (iii) for each of a plurality of first network ports, a number of allowed connection attempts by the computer system using that first network port, and (iv) for each of a plurality of second network ports, a number of blocked connection attempts by the computer system using that second network port. The security system determines, using a neural network, a metric representing an estimated likelihood that the VPN session is associated with a malicious activity, and controls the VPN session based on the metric.

20 Claims, 6 Drawing Sheets

SYSTEMS AND METHODS FOR DETECTING ANOMALOUS VIRTUAL PRIVATE NETWORK SESSIONS USING MACHINE LEARNING

TECHNICAL FIELD

The disclosure relates to systems and methods for detecting anomalous virtual private network sessions using machine learning.

BACKGROUND

Computer systems can communicate with one another using one or more communications networks. Example communications networks include local area networks (for example, Ethernet networks) and wide area networks (for example, the Internet).

In some implementations, computer systems can be connected to one another through one or more public network connections. To improve the security and confidentiality by which data is transmitted between the computer systems, a virtual private network (VPN) can be used to create one or more private network connections across the public network connections.

SUMMARY

The disclosure describes systems and methods for detecting anomalous virtual private network (VPN) sessions using machine learning. In an example implementation, a computerized security system can continuously monitor VPN sessions between several computer systems over a communications network, and gather information regarding the characteristics of each of the VPN sessions. Further, using a computerized neural network, the security system can process the gathered information to determine the likelihood that the VPN sessions are associated with anomalous activity. In some implementations, the security system can automatically control VPN sessions based on the determination, such as automatically terminating VPN sessions that are likely to be associated with anomalous activity. In some implementations, the security system can present the processed data to a user to assist the user in manually controlling the VPN sessions.

The implementations described in this disclosure can provide various technical benefits. For instance, a security system can enable computer systems or computer networks to operate more safely and securely. As an example, the security system can assess the security risk associated with a VPN session, such as a risk that an unauthorized user is attempting to access a secure portion of the computer network during the VPN session, or a risk that a user is attempting to perform a malicious activity using the VPN session. In response, the security system can automatically take action to secure the computer network, such as terminating the VPN session or notifying an administrator regarding the risk. Accordingly, the security system can reduce the likelihood that the computer network is comprised by malicious users.

In an aspect, a method includes obtaining, using one or more processors, first data indicating a plurality of properties of a first virtual private network (VPN) session by a computer system on a communications network, where the properties of the first VPN session include (i) for each of a plurality of first subnets of the communications network, a number of allowed connection attempts by the computer system to that first subnet during the first VPN session, (ii) for each of a plurality of second subnets of the communication network, a number of blocked connection attempts by the computer system to that second subnet during the first VPN session, (iii) for each of a plurality of first network ports, a number of allowed connection attempts by the computer system using that first network port during the first VPN session, and (iv) for each of a plurality of second network ports, a number of blocked connection attempts by the computer system using that second network port during the first VPN session; determining, using a computerized neural network implemented by the one or more processors, a metric for the first VPN session based on the first data, where the metric represents an estimated likelihood that the first VPN session is associated with a malicious activity; and controlling, by the one or more processors, the first VPN session based on the metric.

Implementations of this aspect can include one or more of the following features.

In some implementations, controlling the first VPN session can include terminating the first VPN session.

In some implementations, controlling the first VPN session can include generating a notification to a user indicating that the first VPN session is likely to be associated with the malicious activity.

In some implementations, the malicious activity can include accessing the communications network by an unauthorized user.

In some implementations, the properties of the first VPN session can include a number of unique destinations for network traffic transmitted by the computer system during the first VPN session. Each destination can be represented by a respective network address and a respective network port.

In some implementations, the properties of the first VPN session can include a percentage of network traffic by the computer system that was blocked during the first VPN session.

In some implementations, the properties of the first VPN session can include an amount of network traffic by the computer system that was allowed during the first VPN session, and an amount of network traffic by the computer system that was blocked during the first VPN session.

In some implementations, the properties of the first VPN session can include a rate at which network traffic by the computer system was allowed during the first VPN session, and a rate at which network traffic by the computer system was blocked during the first VPN session.

In some implementations, the properties of the first VPN session can include a time duration of the first VPN session.

In some implementations, the properties of the first VPN session can include an upload transmission rate by the computer system during the first VPN session, and a download transmission rate by the computer system during the first VPN session.

In some implementations, the properties of the first VPN session can include an amount of data uploaded by the computer system during the first VPN session, and an amount of data downloaded by the computer system during the first VPN session.

In some implementations, the method can include training the computerized neural network based on second data indicating of a plurality of properties of additional VPN sessions on the communications network.

In some implementations, the second data can include, for each of the additional VPN sessions, an indication whether that additional VPN was associated with a malicious activity.

In some implementations, the computerized neural network can be selected from among a plurality of candidate computerized neural networks based on a data size of the second data.

In some implementations, training the computerized neural network can include processing the second data using or more autoencoders.

In some implementations, the one or more autoencoders can include at least one of a sparse autoencoder, a denoising autoencoder, a contractive autoencoder, or a variational autoencoder.

In some implementations, training the computerized neural network can include generating one or more data vectors based on the second data. The computerized neural network can be trained based on the one or more data vectors.

In some implementations, the first data can be obtained by the one or more processors subsequent to the termination of the VPN session.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1:
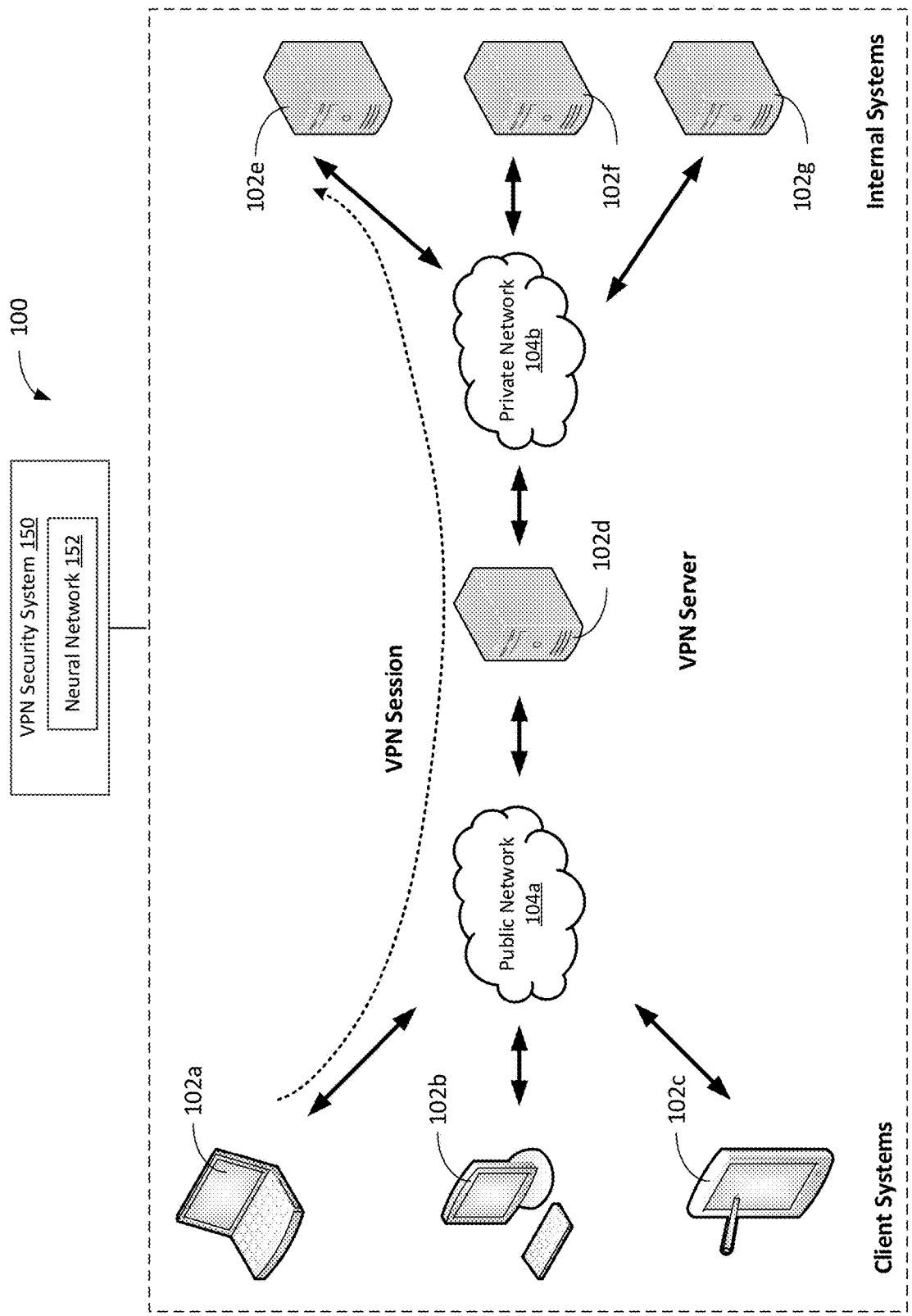
FIG. 1 is a diagram of an example system for exchanging data using a virtual private network (VPN).

FIG. 1 shows an example system 100 for exchanging data using a virtual private network (VPN). The system 100 includes several client computer systems 102a-102c, a VPN server computer system 102d, and several internal computer systems 102e-102g that are communicatively coupled to one another through communications networks 104a and 104b. Further, the system 100 includes a VPN security system 150 having a computerized neural network 152 for detecting anomalous VPN sessions by the client computer systems 102a-102c.

The communications networks 104a and 140b can be any communications networks through which data can be transferred and shared. For example, the communications networks 104a and 140b can be local area networks (LANs) or wide-area networks (WANs), such as the Internet. The communications networks 104a and 140b can be implemented using various networking interfaces, for instance wireless networking interfaces (such as Wi-Fi, Bluetooth, or infrared) or wired networking interfaces (such as Ethernet or serial connection). The communications networks 104a and 140b also can include combinations of more than one network, and can be implemented using one or more networking interfaces.

The communications network 104a is a public communications network. As an example, the public communications network 104a can be the Internet. Further, the communications network 104b is a private communications network. For example, the private communication network 104b can be an internal LAN that is restricted for use to a limited subset of users, such as the employees of a particular company or organization. In some implementations, the private communication network 104b can be used to exchange sensitive information and/or provide functionality that is not intended to be accessible by the public. In some implementations, network traffic into and out of the private communications network 104b (for example, network traffic from the public communications network 104a) can be controlled by one or more firewalls, such that certain types of traffic are blocked from entering or leaving the private communications network 104b.

In this example, the client computer systems 102a-102c are not directly connected to the private communications network 104b. However, the client computer systems 102a-102c can gain access of the private communications network 104b (and the internal computer systems 102e-102g that are connected to the private communications network 104b) by establishing respective VPN sessions with the VPN server computer system 102d using the public communications network 104a. As an example, each of the client computer systems 102a-102c can create a private network connection across one or more of the public network connections provided by the public communications network 104a, such that network traffic is "tunneled" between the private communications network 104b and the client computer systems 102a-102c.

Data can be exchanged between the client computer systems 102a-102c and the private communications network 104b using the VPN sessions, as though the client computer systems 102a-102c were directly connected to the private communications network 104b. For example, using the VPN sessions, the client computer systems 102a-102c can transmit data intended for the private communications network 104b to the VPN server computer system 102d. Upon receipt of the data, the VPN server computer system 102d can route the data to the private communications network 104b (for example, to one or more of the internal computer system 102e-102g). As another example, the internal computer systems 102e-102g can transmit data intended to the client computer systems 102a-102c to the VPN server computer system 102d. Upon receipt of the data, the VPN server computer system 102d can route the data to the client computer systems 102a-102c using the VPN sessions.

In some implementations, each of the VPN sessions can be encrypted, such that the data exchanged between the client computer systems 102a-102c and the private communications network 104b is not exposed to members of the public. Further, the VPN server computer system 102d can require that each of the client computer systems 102a-102c provide security credentials when establishing a VPN session. For example, the VPN server computer system 102d can require that each of the client computer systems 102a-102c provide a valid user name and password, a security certificate or token, or some other form of authentication, such that unauthorized users cannot access the private communications network 104b.

However, in some implementations, malicious users may attempt to access the private communications network 104b using VPN sessions. For example, a malicious user may gain access to an authorized user's security credentials, and provide the security credentials to the VPN computer system 102d in an attempt to establish a VPN session. As another example, a malicious user may attempt to compromise the private communications network 104b and/or the internal computer systems 102e-102g using a VPN sessions, such as by exploiting security vulnerabilities in the private communications network 104b and/or the internal computer systems 102e-102g. As another example, a malicious may attempt to obtain sensitive information stored on the private communications network 104b and/or the internal computer systems 102e-102g. As another example, a malicious may attempt to destroy information stored on the private communications network 104b and/or the internal computer systems 102e-102g.

The VPN security system 150 is configured to detect anomalous VPN sessions, such as VPN sessions that are used by malicious users to perform malicious activities. For example, the VPN security system 1500 can monitor each of the VPN sessions established by the client computer systems 102a-102c, and gather information regarding the characteristics of each of the VPN sessions. Further, using the computerized neural network 152, the VPN security system 150 can process the gathered information to determine the likelihood that the VPN sessions are associated with anomalous activity. In some implementations, the VPN security system 150 can automatically control VPN sessions based on the determination, such as automatically terminating VPN sessions that are likely to be associated with anomalous activity. In some implementations, the security system can present the processed data to a user to assist the user in manually controlling the VPN sessions.

Figure 2:
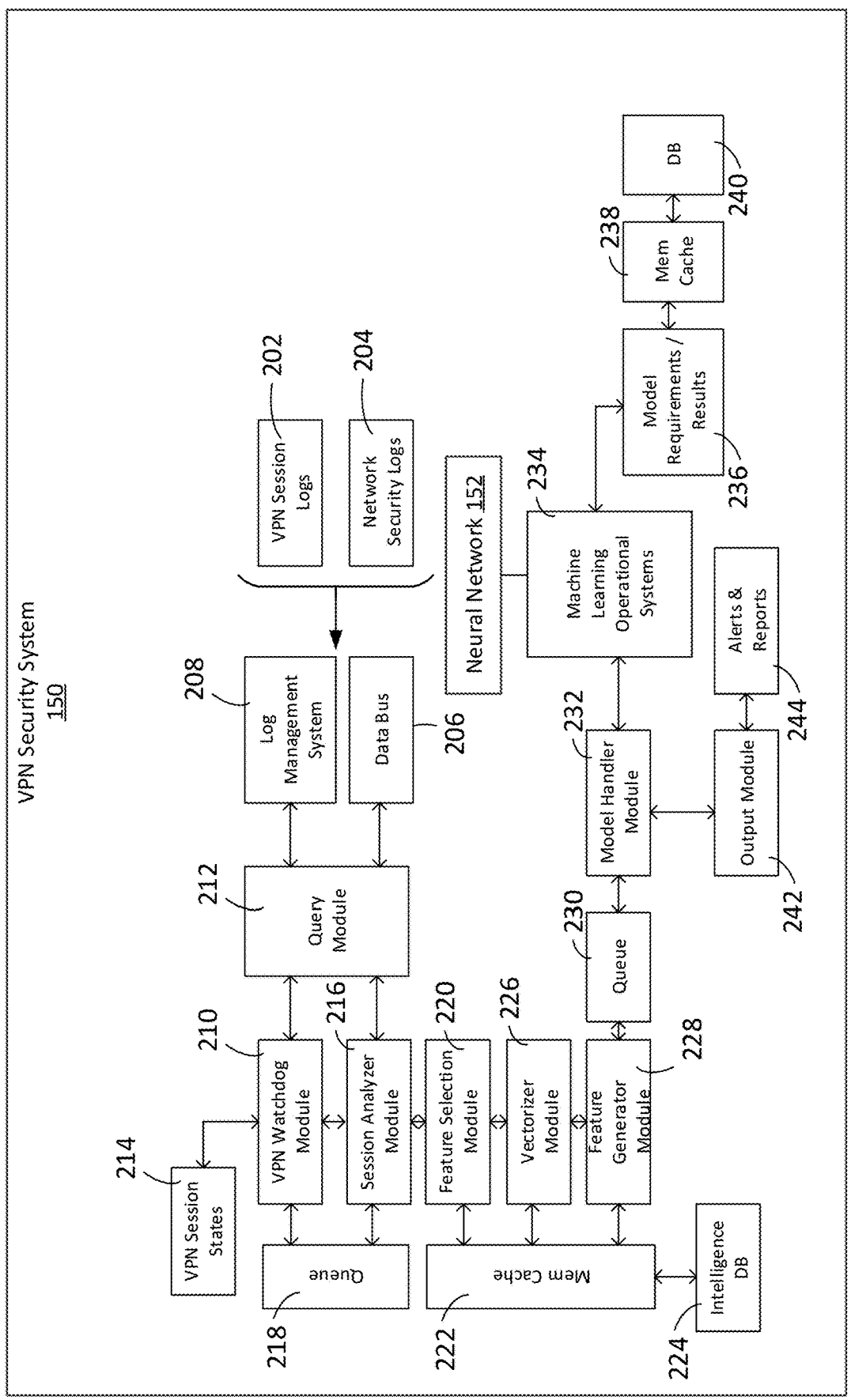
FIG. 2 is an example VPN security system.

FIG. 2 shows example modules of the VPN security system 150. Each of the modules can be implemented by digital electronic circuitry, computer software, firmware, or hardware, or in combinations of one or more of them. As an example, some or all of the modules can be implemented using one or more computer systems (for example, the computer system 600 described with respect to FIG. 6).

During operation, the VPN security system 150 obtains VPN session logs 202 regarding VPN sessions that are currently active or were previously active on the system 100. For instance, the VPN session logs 202 can include information regarding the characteristics of each of the VPN sessions. Example information includes the time at which a VPN session began, a time at which a VPN session ended (if the VPN session has already ended), a name or identity of a user that initiated the VPN session, a network address associated with the VPN session (for example, an internet protocol (IP) address), and an amount of data transmitted during the VPN session.

Further, the VPN security system 150 also obtains network security logs 204 regarding the communications networks of the system 100. For instance, the network security logs 204 can include information regarding attempts to access network resources on the communications networks, such as attempts made by the client computer systems during VPN sessions. As an example, according to a network security policy, a client computer system can be allowed to access network resources having certain network addresses (for example, IP addresses) and/or network ports, and can be prevented or blocked from accessing network resources having certain other network addresses and/or network ports. The network security logs 204 can indicate that time that each attempt occurred, the network resource for which access had been attempted, and the outcome of the attempt (for example, whether the attempt was successful or was blocked). In some implementations, the network security logs 204 can be retrieved from one or more firewalls or other security systems of the private communications network 104b.

In some implementations, at least some of the VPN session logs 202 and network security logs 204 can be retrieved using one or more data buses 206. In some implementations, at least some of the VPN session logs 202 and network security logs 204 can be stored in a log management system 208 (for example, a database module having one or more data storage devices) for future retrieval.

The VPN security system 150 also includes a VPN watchdog module 210 that determines a state or status of each of the VPN sessions based on the VPN session logs 202 and the network security logs 204. For example, using a query module 212, the VPN watchdog module 210 can periodically submit queries (for example, micro-batched queries) to the log management system 208, and obtain information regarding one or more of the VPN sessions that are currently active or were previously active on the system 100. Based on the information, the VPN session logs can generate VPN session state data 214 indicating the current state or status of each of the VPN sessions. In some implementations, the VPN session state data 214 can indicate whether each VPN session is currently active (for example, connected and transmitting data) or inactive (for example, disconnected or terminated). In some implementations, the VPN session state data 214 can be stored in the form of a data or state table, and can be updated periodically by the VPN watchdog module 210 based on information retrieved from the log management system 208 and/or the data bus 206.

In some implementations, the VPN watchdog module 210 can queue information regarding VPN sessions for further analysis by a session analyzer module 216. For example, for each of VPN sessions on the system 100, the VPN watchdog module 210 can generate one or more data items that include information obtained from the VPN session logs 202 and network security logs 204 regarding that VPN session. Further, the VPN watchdog module can transmit the data items for a queue module 218 (for example, a data buffer or data storage device) to await further analysis. In some implementations, the VPN watchdog module 210 can transmit data regarding a VPN session to the queue module 218 when the VPN session has ended (for example, when the VPN session state data 214 indicates that the VPN session is no longer active). In some implementations, the VPN watchdog module 210 can transmit data regarding a VPN session to the queue module 218 even while the VPN session is still active.

The session analyzer module 216 retrieves the data items from the queue module 218 (for example, according to a particular priority or order), and processes the retrieved data items. In some implementations, the session analyzer module 216 can generate data records summarizing each of the VPN sessions. As an example, a data record for a VPN session can include one or more of the following:

An identity (for example, a user name) of the user that initiated the VPN session,
A network security policy associated with that user (for example, a "user policy"),
A VPN tunnel IP for the VPN session,
A start time of the VPN session,
An end time of the VPN session, A duration of the VPN session, An amount of data transferred during the VPN session (for example, a number of uploaded bytes and an number of a downloaded bytes), and A list of unique combinations of destination network addresses and network ports to which connection attempts were allowed during the VPN session, and a number of allowed attempts to each of those network address and network port combinations, and A list of unique combinations of destination network addresses and network ports to which connection attempts were blocked during the VPN session, and a number of blocked attempts to each of those network address and network port combinations.

Example lists of connections (with their associated network address and network ports) are shown below:

Allowed connection attempts to IP address:port combination, with count:

10.10.123.43:80, count=5
   10.11.144.32:80, count=123
   10.10.123.123:80, count=34
   10.10.123.43:443, count=100

Blocked connection attempts to IP address:port combination, with count:

10.10.23.45:21 count=34
   10.11.12.33:21 count=76

In this example, during a VPN session, five successful connection attempts were made to the destination IP address 10.10.123.43 over the network port 80, 123 successful connection attempts were made to the destination IP address 10.11.144.32 over the network port 80, and so forth. Further, during the VPN session, 34 connection attempts were blocked for the destination IP address 10.10.23.45 over the network port 21, and 76 connection attempts were blocked for the destination IP address 10.11.12.33:21 over the network port 76.

In some implementations, the session analyzer module 216 can also retrieve data from the log management system 208 and/or data buses 206 using the query module 212 (including the VPN session logs 202 and the network security logs 204), and generate data records based on the retrieved data.

The session analyzer module 216 transmits the data records to a feature selection module 220 for further processing. The feature selection module 220 sorts, correlates, and normalizes the data records regarding the VPN sessions according to one or more dimensions. For example, the feature selection module 220 can identify dimensions or "features" of data based on the data records output by the session analyzer module 216 and business logic data that includes information regarding the "user policys" associated with the users that initiated the VPN sessions.

For instance, according to the business logical data, each user can be assigned a different set of permissions, depending on their role a company or organization. For example, a "regular" user can be assigned a "regular" user policy with a first set of permissions, a system or network administrator can be assigned an "administrator" user policy with a second set of permissions, a manager can be assigned a "management" user policy with a third set of permissions, and so forth.

In some implementations, the business logical data can indicate, for each user or group of users, the subnets of the private communication network 104b and associated network ports that the user or group of users has access to, the subnets of the private communication network 104b and associated network ports that the user or group of users does not have access to (for example, for which access is blocked by a firewall), the network ports that were utilized during a VPN session, and so forth. A subnet of the private communication network 104b can be, for example, a logical division, a portion, or a subset of the private communications network 104b, such as a range of IP addresses.

In some implementations, the feature selection module 220 can select features pertaining to the network addresses and ports to which a client computer is permitted to access during a VPN session (for example, in accordance with the permissions or user policy assigned to the user who initiated the VPN session).

As an example, one of the features can include an indication of each subnet of the private communications network 104b that a user is permitted to access during a VPN session (for example, in accordance with the user policy associated with that user). Further, a feature can include an indication of the number of unique combinations of (i) destination network addresses (for example, IP address) in that subnet and (ii) network ports to which the user successfully attempted to connect during the VPN session.

For instance, in the example list of connection attempts above, the feature for the subnet 10.10.123.0/24 can be three (for example, the user successfully connected to three unique combinations of IP addresses and port numbers in the subnet 10.10.123.0/24 during the VPN session). Further, in the example list of connection attempts above, the feature for the subnet 10.11.144.0/24 can be one (example, the user successfully connected to one unique combination of IP addresses and port numbers in the subnet 10.10.123.0/24 during the VPN session). Further, the in the example list of connection attempts above, the feature for the remaining subnets can be zero.

As another example, one of the features can include, for each of the network ports, an indication of a number of unique destination network addresses to which the user successfully attempted to connect during the VPN session.

For instance, in the example list of connection attempts above, the feature for the network port 80 can be three (for example, the user successfully connected to three unique IP addresses using the network port 80 during the VPN session). Further, in the example list of connection attempts above, the feature for the network port 443 can be one (for example, the user successfully connected to one unique IP address using the network port 443 during the VPN session). Further, the in the example list of connection attempts above, the feature for the remaining ports can be zero.

As another example, a feature can include, for each network port, a percentage of successful connection attempts that occurred over that network port during a VPN session.

For example, in the example list of connection attempts above, the feature for the network port 443 can be 38.16% (for example, 38.16% of the success connection attempts occurred over the network port 443). Further, in the example list of connection attempts above, the feature for the network port 80 can be 61.84% (for example, 61.84% of the success connection attempts occurred over the network port 80). Further, the in the example list of connection attempts above, the feature for the remaining ports can be zero.

As another example, a feature can include, for each network port, a number of unsuccessful attempts (for example, blocked attempts) that occurred over that network port during a VPN session.

For example, in the example list of connection attempts above, the feature for the network port 21 can be 110 (for example, 110 unsuccessful connection attempts were made over the network port 21). Further, the in the example list of connection attempts above, the feature for the remaining ports can be zero.

As another example, a feature can include, for each network port, a number of unique network addresses to which the user unsuccessfully attempted to connect using that network port during the VPN session.

For example, in the example list of connection attempts above, the feature for the network port 21 can be two (for example, the user unsuccessfully attempted to connect to two different IP addresses using the network port 21. Further, the in the example list of connection attempts above, the feature for the remaining ports can be zero.

In some implementations, the feature selection module 220 can select features pertaining to network traffic associated with a VPN session. As an example, a feature can include a number of unique network address and network ports to which the user successfully connected during a VPN session. As another example, a feature can include a percentage blocked traffic during a VPN session (for example, a percentage of the total connection attempts that were blocked). As another example, a feature can include a number of allowed connection attempts during the VPN session. As another example, a feature can include a number of blocked connection attempts during the VPN session. As another example, a feature can include a rate at which connection attempts were allowed during the VPN session (for example, a number of allowed attempts per second). As another example, a feature can include a rate at which connection attempts were blocked during the VPN session (for example, a number of blocked attempts per second). As another example, a feature can include a rate at which data was uploaded from the client computer system to the VPN server during the VPN session. As another example, a feature can include a rate at which data was downloaded by the client computer system from the VPN server during the VPN session. As another example, a feature can include the amount of data that was uploaded from the client computer system to the VPN server during the VPN session. As another example, a feature can include the amount of was downloaded by the client computer system from the VPN server during the VPN session. As another example, a feature can include a duration of the VPN session (for example, in seconds).

In some implementation can, the feature selection module 220 can collect historical information regarding several VPN sessions that were established over a period of time in the past (for example, in the previous one or more days, weeks, months, years, or some other time period). Further, the feature selection module 220 can periodically collect new information over time, and update the data records based on the newly collected information. At least some of the processed data records can be stored, for example, in a memory cache 222 and/or an intelligence database module 224 having one or more data storage devices for future retrieval.

The VPN security system 150 also includes a vectorizer module 226, a feature generator module 228, a model handler module 232, and a machine learning operational system 234 for training and utilizing the computerized neural network 152.

The vectorizer module 226 ingests the normalized data records provided by the feature selection module 220 and generates data vectors based on the data records. In some implementations, the vectorizer module 226 can retrieve at least some of the data records from the memory cache 222 and/or the intelligence database module 224, and generate data vectors for the data records in real time or substantially real time.

The vectorizer module 226 can generate data vectors representing the information contained in the data records using direct vectorization, meta-enhanced vectorization (for example, vectorization based on metadata), fuzzy vectorization, or a combination of vectorization techniques. For direct vectorization, the information contained in the data records are vectorized directly into vector data structures (for example, without the use of additional information or metadata). For meta-enhanced vectorization, metadata from known intelligence sources relating to or associating with known malicious activities or triggers can be incorporated into the features of the data records, and then vectorized into data vectors accordingly. For fuzzy vectorization, information contained in the data records can be vectorized into data vectors based on a fuzzy searches to determine fuzzy associated with known malicious activities or behaviors.

At least some of the data vectors can be stored, for example, in the memory cache 222 and/or an intelligence database module 224 for future retrieval.

The feature generator module 228 ingests the data vectors from the vectorizer module 226, and generates features for ingestion by the computerized neural network 152 to perform predictions. In some implementations, the feature generator module 228 can perform autoencoding to facilitate the generation of features. In some implementations, the output of the autoencoders can be used as a "final" set of features to train the computerized neural network 152. In some implementations, the autoencoders themselves can be used for anomaly detection.

Several types of autoencoders can be used to perform autoencoding, such as sparse autoencoders, denoising autoencoders, contractive autoencoders, and variational autoencoders. In a sparse autoencoder, a first set of features is "hidden" for training and a second set of features is "active" for training. Accordingly, the computerized neural network 152 can be trained based on a limited subset of features, rather than the entirety of the features. In a denoising autoencoder, data noise is removed from the data vectors, such as noise associated with corrupted data inputs or measurements that may negatively impact the training or use of the computerized neural network 152. In a contractive autoencoder, a regularizer module is used to make the computerized neural network 142 more robust against variations in input data. In a variational autoencoder, a generative adversarial approach is performed by using a recognition model and a generative model that utilize the features of the data vectors to compute a directed probabilistic graphical model with loss and estimator. Either of these approaches can be performed to modify the input vectors from the vectorizer module 226, or to utilize the trained autoencoders themselves as trained models. In some implementations, an automated and recursive technique can be used to find the best feature set and model pairs for optimal accuracy and precision.

At least some of the generated features can be stored, for example, in the memory cache 222 and/or an intelligence database module 224 for future retrieval. Further, at least some of the generated features can be queued in a queue module 230 for further processing by a model handler module 232.

The model handler module 232 periodically or continuously queries the queue module 230 for one or more sets of features generated by the feature generator module 228, and selects a computation model for generating and training the computerized neural network 152 based on the features. For example, the model handler module 232 can retrieve the sets of features from the queue module 230, and analyze the features to select a computational model from among a pool of candidate computational models for generating the computerized neural network 152. As an example, if the set of features is relatively small in size or relatively low in complexity, the model handler module 232 can select a computation model that does not rely on "deep learning" techniques to reduce the expenditure of computation resources during the training process. As another example, if the set of features is relatively large in size or relatively complex, the model handler module 232 can select a computation model that does utilizes deep learning techniques to better identify complex trends or correlations during the training process.

Further, the configuration parameters can specify a desired accuracy and a set of variations that can be used to generate and train the computerized neural network 152. The desired accuracy can be expressed, for example, as a number of false positives or false negatives, a rate of false positions or false negatives, a loss or residual value between predictions from "ground truth" data, a processing speed, a distance between anomalous and "normal" samples, a percentage of anomalous samples, or any other metric.

The variations can include different sets of configurations to control the structure of the computerized neural network 152 and tunable "hyperparameters" that control the generating and training process. The configurations and hyperparameters can be adjusted to achieve a particular desired result or goal. For example, an administrator may adjust the configurations and hyperparameters to increase the number of nodes in the computerized neural network 152 if the calculated loss or residuals for the computerized neural network 1523 are high (for example, indicating that the predictive value of computerized neural network 152 is low).

The machine learning operational system 234 uses the selected computational model to generate and train the computerized neural network 152. As an example, the machine learning operational system 234 can train the computerized neural network 152 in accordance with the computational model based on the features generated by the feature generator module 228, such that the computerized neural network 152 can recognize patterns or trends in input data that are indicative of an anomalous VPN session. An example training process is discussed in greater detail with reference to FIG. 4.

Further, the machine learning operational system 234 can receive data regarding new VPN sessions (for example, data from the VPN session logs 202 and the network security logs 204) regarding newly established VPN sessions), and input at least some of the data into the computerized neural network 152 for processing. In some implementations, the inputted data can have similar dimensions or "features" as the data that was used to generate and train the computerized neural network 152, such that the computerized neural network 152 can be used to predict a particular result based on the inputted data. As an example, the inputted data can include one or more of the features described above.

The output 236 of the computerized neural network 152 can indicate a security risk associated with the VPN session, such as a metric indicating a likelihood that the VPN session is associated with anomalous activity. The output 236 of the computerized neural network 152 can be stored, for example, in a memory cache 238 and/or a database module 240 having one or more data storage devices for further retrieval.

Further, the VPN security system 150 can output information to a user that summarizes the generating, training, and use of the computerized neural network 152. For an output module 242 can generate one or more alerts or reports 244 to a user summarizing the selection of a computation model, the performance of the selected computational model, and the set of configurations and hyperparameters that were used for the selected the computational model. As another example, the output module 242 can generate one or more alerts or reports 244 that identify anomalous VPN sessions that were detected by the VPN security system 150 using the computerized neural network 152. In some implementations, the alerts or reports 244 can be transmitted via email or using an application programming interface (API) for a third party system, such as a security incident and event management (SIEM) system or an incident response platform (IRP).

As described above, in some implementations, a VPN security system 150 can perform one or more machine learning or artificial intelligence processes to identify patterns or trends in input data that are indicative of an anomalous VPN session, and to identify security risks based on those patterns or trends. For example, the computerized neural network 152 can be trained using historical data regarding previously established VPN sessions and/or synthetically generated data (for example, data regarding simulated VPN sessions). This training data can include information regarding the characteristics of each of these VPN sessions, and information regarding whether each of these VPN sessions had been associated with an anomalous activity (for example, an attempt by a malicious user to gain access to other otherwise compromise a private communication network). Accordingly, the VPN security system 150 can be trained to identify new security risks based on previously identified security risks or synthetically generated security risks.

Figure 3:
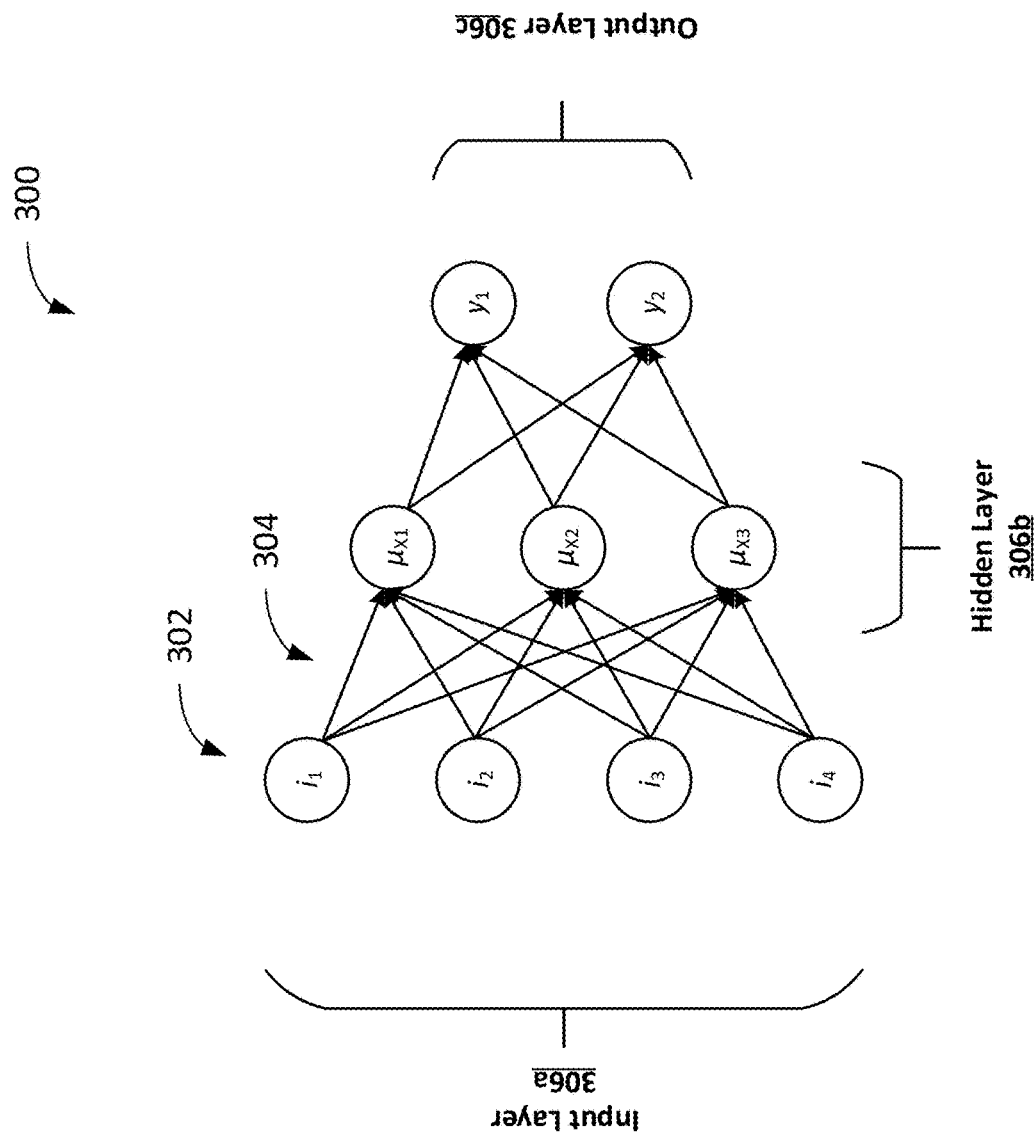
FIG. 3 is a diagram of an example neural network.

In some implementations, a machine learning process can be performed using one or more computerized neural networks 152. A simplified example of a computerized neural network 152 is shown in FIG. 3.

The computerized neural network 300 includes several nodes 302 (often called "neurons") interconnected with another by interconnections 304. Further, the nodes 302 are arranged according to multiple layers, including an input layer 306a, a hidden layer 306b, and an output layer 306c. The arrangement of the nodes 302 and the interconnections 304 between them represent a mathematical transformation of input data (for example, as received by the nodes of the input layer 306a) into corresponding output data (for example, as output by the nodes of the output layer 306c). In some implementations, the input data can represent one or more data points or "features" obtained by the VPN security system 150, and the output data can represent one or more corresponding outcomes or decisions generated by the VPN security system 150 based on the input data.

The nodes 302 of the input layer 306a receive input values and output the received input values to respective nodes of the next layer of the computerized network 300. In this example, the computerized neural network 300 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (for example, as indicated by the interconnections 304).

In some implementations, at least some of the information stored by the VPN security system 150 (for example, information regarding a particular VPN session) can be used as inputs for the nodes of the input layer 306a. For example, at least some of the information stored by the VPN security system 150 can be expressed numerically (for example, assigned a numerical score or value), and input into the nodes of the input layer 306a. An example inputs include information from the VPN session logs 202, the network security logs 204, the features selected by the feature selection module 220, the data vectors generated by the vectorizer module 226, and/or the features generated by the feature generator module 228.

The nodes of the hidden layer 306b receive input values (for example, from the nodes of the input layer 306a or nodes of other hidden layers), applies particular transformations to the received values, and outputs the transformed values to respective nodes of the next layer of the computerized neural network 300 (for example, as indicated by the interconnections 304). In this example, the computerized neural network 300 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 306b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n} (\text{weight}_i * \text{input}_i) + \text{bias},$$

where $\text{weight}_i$ is the weight that is applied to an input $\text{input}_i$, bias is a bias or offset value is that is applied to the sum of the weighted inputs, and Y is the output of the node.

The nodes of the output layer 306c receive input values (for example from the nodes of the hidden layer 306b) and output the received values. In some implementations, nodes of the output layer 306c can also receive one or more input values, and transform the one or more received values according to a mathematical transfer function (for example, in a similar manner as the nodes of the hidden layer 306b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In this example, the computerized neural network 300 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the computerized neural network 300.

Although FIG. 3 shows example nodes and example interconnections between them, this is merely an illustrative example. In practice, a computerized network can include any number of nodes that are interconnected according to any arrangement. Further, although FIG. 3 shows a computerized neural network 300 having a single hidden layer 306b, in practice, a network can include any number of hidden layers (for example, one, two, three, four, or more), or none at all.

Figure 4:
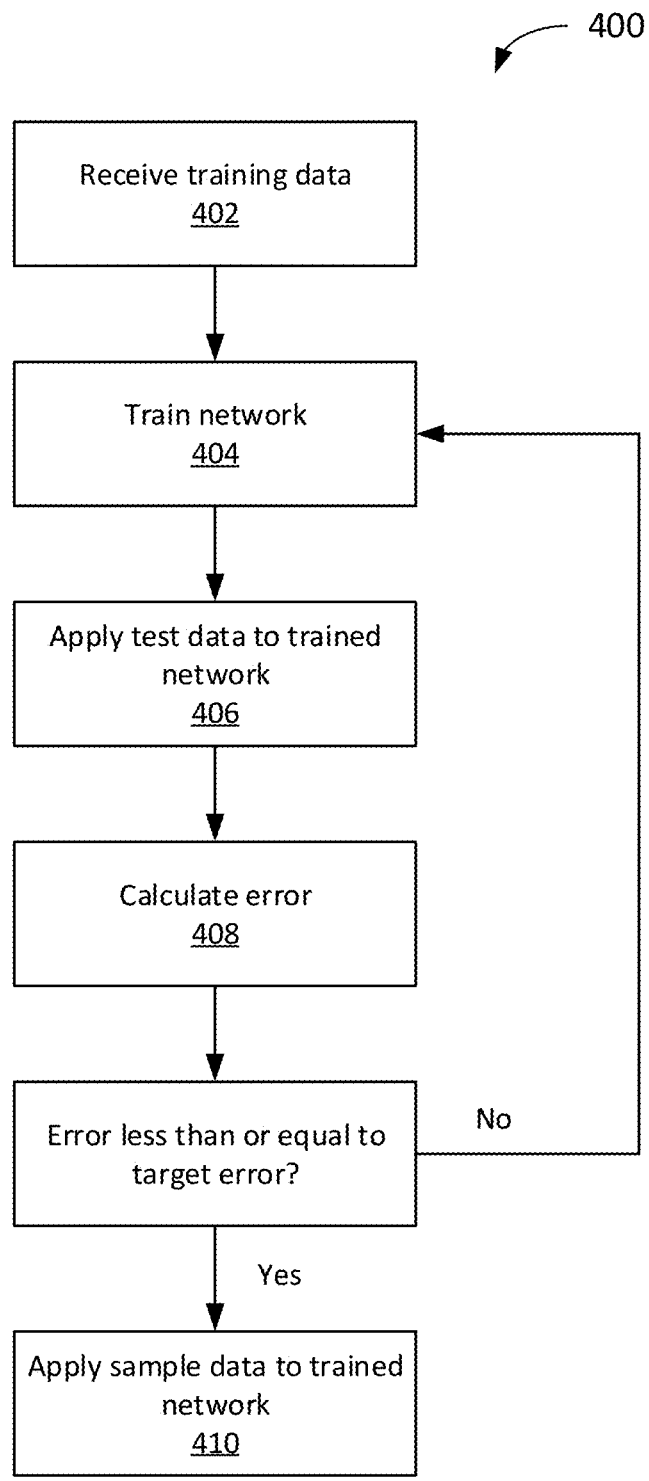
FIG. 4 is a flow chart diagram of an example process for training a computerized neural network.

In some implementations, the computerized neural network 152 can be train based on training data. An example process 400 for training a computerized neural network is shown in FIG. 4.

According to the process 400, the VPN security system 150 receives training data (block 402). For example, as described above, the training data can include historical or synthetic data or regarding one or more VPN sessions. The data can include information regarding the characteristics of each of these VPN sessions. Further, the data can include information regarding whether each of these VPN sessions had been associated with an anomalous activity (for example, an attempt by a malicious user to gain access to other otherwise compromise a private communication network). This information can be used as the corresponding "ground truth" (for example, known outcomes given certain combinations of input data, or desired decisions by the VPN security system 150 given certain combinations of input data). In the event that the "ground truth" is not available, an autoencoder neural network can be trained to learn the normal users' VPN sessions. As an example, future vectorized VPN sessions can be inputted to the trained autoencoder. The difference between input to the trained autoencoder and the autoencoder output can be calculated. The calculated value (for example, a deviation score) can represent how much the current VPN session being evaluated deviates from previous VPN sessions. VPN sessions with high deviation scores that exceed a threshold can be determined to be anomalous and can be terminated or reported for further analysis and investigation.

The VPN security system 150 trains the neural network based on the training data (block 404). For example, based on this training data, the VPN security system 150 can iteratively modify the arrangement of the nodes, the interconnections between the neural networks, and the transfer functions of each of the nodes (for example, the weights, the biases, or other aspects of the transfer function) to increase the predictive value of the computerized neural network. For instance, the VPN security system 150 can iteratively perform these modifications, such that when the inputs of the training data are provided to the computerized neural network, output of the computerized neural network better matches the "ground truth" indicated by the training data.

After training the computerized neural network, the VPN security system 150 applies test data (also referred to as "validation data") to the trained neural network (block 406). As an example, the VPN security system 150 can reserve a portion of the training data as test data, such that it is not used for training the computerized neural network in block 404. After the computerized neural network has been trained in block 604, the VPN security system 150 can apply the test data as inputs to the trained neural network, and determine how well the neural network predicts the security risk based on the test data.

The VPN security system 150 can calculate an error between (i) the security risk determined by the neural network based on the test data), and (ii) the known security risk specified by the test data (block 408).

If the error is sufficiently high (for example, greater than a threshold error value), the VPN security system 150 can re-train the neural network (for example, by modifying the arrangement of the nodes, the interconnections between the nodes, and the transfer functions of one of more of the nodes) (block 404). In some implementations, the VPN security system 150 can re-train the network by obtaining additional training data, and using the additional training data to re-train the neural network.

If the error is sufficiently low (for example, less than or equal to the threshold error value), the VPN security system 150 can apply newly acquired sample data to the trained neural network (block 410). The newly acquired sample data can include, for example, information obtained during an operation of the system 100, such as when new VPN sessions are established by the client computer devices 102a-102c.

Accordingly, the VPN security system 150 can be trained to identify new security risks based on previously identified security risks or synthetically generated security risks.

As described above, in some implementations, the VPN security system 150 can be iteratively trained and re-trained with successive sets of training data (for example, additional sets of training data that are collected over time) to progressively improve its accuracy in identifying security risks. In some implementations, this training process can be performed automatically by the VPN security system 150 without manual user input.

In some implementations, the output of a computerized neural network can be a security metric, the value for which represents a security risk associated with a particular VPN session. For example, the value of the security metric can represent a likelihood or probability that a particular VPN session is associated with a malicious activity. In some implementations, if the security metric for a particular VPN session (for example, exceeds a threshold value), the VPN security system 150 can automatically terminate the VPN session or notify an administrator regarding the risk. Further, if the security metric for a particular VPN session is sufficiently low (for example, is less than or equal to the threshold value), the VPN security system 150 can allow the VPN session to continue.

In some implementations, the security metric can be expressed as one or more numerical values. The value of the security metric can be determined based one or more of the characteristics described in this disclosure. For example, when a VPN session is established, information regarding the characteristics of the VPN session can be used as inputs in a computerized neural network. Further, the output of the computerized neural network can be a numerical value that represents a security risk associated with the VPN session. As an example, a higher value can correspond to a higher security risk, whereas a lower value can correspond to a lower security risk.

Based on the output, the VPN security system 150 can selectively allow the VPN session to continue, or terminate the VPN session. For example, if the security metric is higher than a particular threshold value (for example, indicating that the security risk is sufficiently high), the VPN security system 150 can selectively determinate the VPN session.

Example Processes

Figure 5:
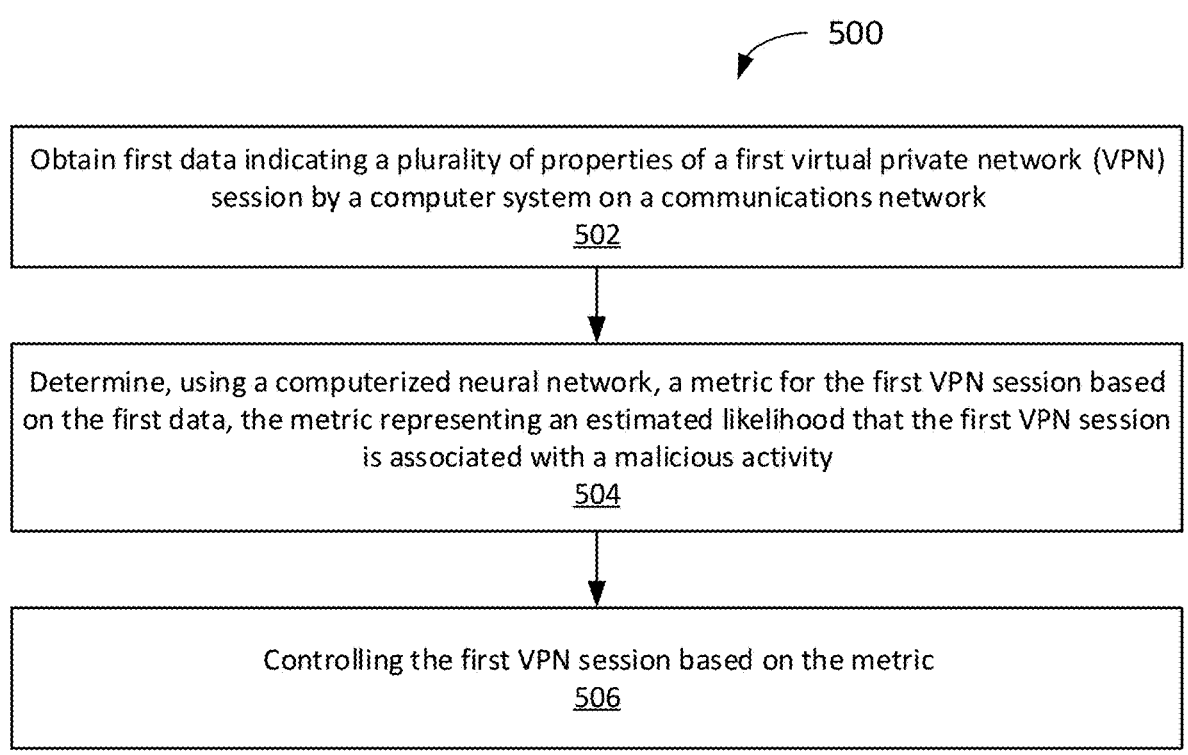
FIG. 5 is a flow chart diagrams of example processes for detecting anomalous VPN sessions using machine learning.

An example process 500 for detecting anomalous virtual private network sessions using machine learning is shown in FIG. 5. In some implementations, the process 500 can be performed by the VPN security systems described in this disclosure (for example, the VPN security system 150 shown and described with reference to FIGS. 1 and 2) using one or more processors (for example, using the processor or processors 610 shown in FIG. 6).

In the process 500, one or more processors obtain first data indicating a plurality of properties of a first virtual private network (VPN) session by a computer system on a communications network (block 502). In some implementations, the first data can be obtained by the one or more processors subsequent to the termination of the VPN session.

The properties of the first VPN session include (i) for each of a plurality of first subnets of the communications network, a number of allowed connection attempts by the computer system to that first subnet during the first VPN session, (ii) for each of a plurality of second subnets of the communication network, a number of blocked connection attempts by the computer system to that second subnet during the first VPN session, (iii) for each of a plurality of first network ports, a number of allowed connection attempts by the computer system using that first network port during the first VPN session, and (iv) for each of a plurality of second network ports, a number of blocked connection attempts by the computer system using that second network port during the first VPN session.

In some implementations, the first data can indicate additional properties of the first VPN session, either instead of or in addition to those described above. For example, the properties of the first VPN session can include a number of unique destinations for network traffic transmitted by the computer system during the first VPN session, where each destination is represented by a respective network address and a respective network port.

As another example, the properties of the first VPN session can include a percentage of network traffic by the computer system that was blocked during the first VPN session.

As another example, the properties of the first VPN session can include an amount of network traffic by the computer system that was allowed during the first VPN session, and an amount of network traffic by the computer system that was blocked during the first VPN session, As another example, the properties of the first VPN session can include a rate at which network traffic by the computer system was allowed during the first VPN session, and a rate at which network traffic by the computer system was blocked during the first VPN session.

As another example, the properties of the first VPN session can include a time duration of the first VPN session.

As another example, the properties of the first VPN session can include an upload transmission rate by the computer system during the first VPN session, and a download transmission rate by the computer system during the first VPN session.

As another example, the properties of the first VPN session can include an amount of data uploaded by the computer system during the first VPN session, and an amount of data downloaded by the computer system during the first VPN session.

A metric for the first VPN session is determined using a computerized neural network implemented by the one or more processors and based on the first data (block 504). The metric represents an estimated likelihood that the first VPN session is associated with a malicious activity. In some implementations, the malicious activity can include accessing the communications network by an unauthorized user.

The one or more processors control the first VPN session based on the metric (block 506). In some implementations, controlling the first VPN session can include terminating the first VPN session. In some implementations, controlling the first VPN session can include generating a notification to a user indicating that the first VPN session is likely to be associated with the malicious activity.

In some implementations, the process 500 can also include training the computerized neural network based on second data indicating of a plurality of properties of additional VPN sessions on the communications network. The second data can include, for each of the additional VPN sessions, an indication whether that additional VPN was associated with a malicious activity.

In some implementations, the computerized neural network is selected from among a plurality of candidate computerized neural networks based on a data size of the second data.

In some implementations, training the computerized neural network can include processing the second data using or more autoencoders. Example autoencoders include a sparse autoencoder, a denoising autoencoder, a contractive autoencoder, and a variational autoencoder.

In some implementations, training the computerized neural network can include generating one or more data vectors based on the second data. The computerized neural network can be trained based on the one or more data vectors.

Additional details regarding the training of a computerized neural network are described for example, with reference to FIGS. 2-4.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and the modules of the VPN security system 150 can be implemented using digital electronic circuitry, or in computer software, firmware, or hardware, or in combinations of one or more of them. In another example, the process 500 shown in FIG. 5 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 6:
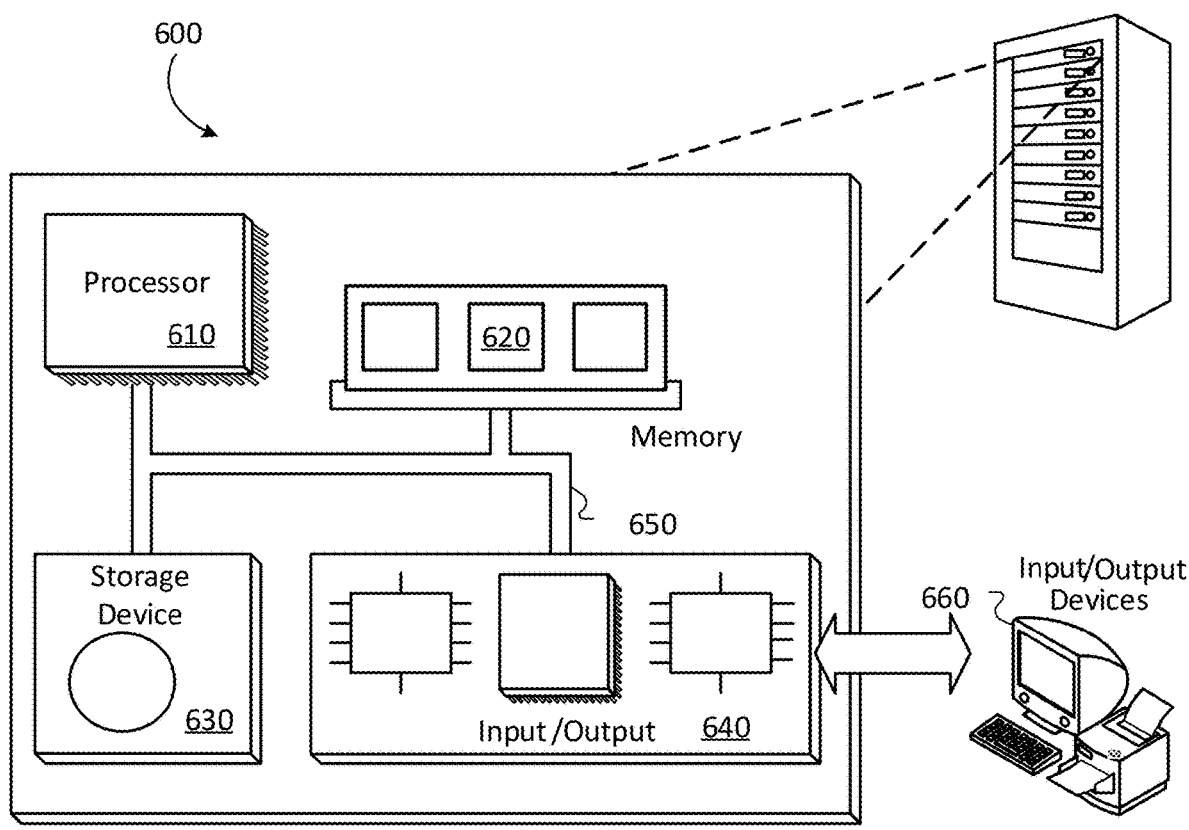
FIG. 6 is a schematic diagram of an example computer system.

FIG. 6 shows an example computer system 600 that includes a processor 610, a memory 620, a storage device 630 and an input/output device 640. Each of the components 610, 620, 630 and 640 can be interconnected, for example, by a system bus 650. The processor 610 is capable of processing instructions for execution within the system 600. In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the system 600.

The input/output device 640 provides input/output operations for the system 600. In some implementations, the input/output device 640 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:
obtaining, using one or more processors, first data indicating a plurality of properties of a first virtual private network (VPN) session by a computer system on a communications network, wherein the properties of the first VPN session comprise:
a number of allowed connection attempts by the computer system to each of a plurality of first subnets of the communications network during the first VPN session,
a number of blocked connection attempts by the computer system to each of a plurality of second subnets of the communications network during the first VPN session,
a number of allowed connection attempts by the computer system using each of a plurality of first network ports during the first VPN session, and
a number of blocked connection attempts by the computer system using each of a plurality of second network ports during the first VPN session;
determining, using a computerized neural network implemented by the one or more processors, a metric for the first VPN session based on the first data, wherein the metric represents an estimated likelihood that the first VPN session is associated with a malicious activity; and
controlling, by the one or more processors, the first VPN session based on the metric.

2. The method of claim 1, wherein controlling the first VPN session comprises terminating the first VPN session.

3. The method of claim 1, wherein controlling the first VPN session comprises generating a notification to a user indicating that the first VPN session is likely to be associated with the malicious activity.

4. The method of claim 1, wherein the malicious activity comprises accessing the communications network by an unauthorized user.

5. The method of claim 1, wherein the properties of the first VPN session further comprise:
a number of unique destinations for network traffic transmitted by the computer system during the first VPN session, wherein each destination is represented by a respective network address and a respective network port.

6. The method of claim 1, wherein the properties of the first VPN session further comprise:
a percentage of network traffic by the computer system that was blocked during the first VPN session.

7. The method of claim 1, wherein the properties of the first VPN session further comprise:
an amount of network traffic by the computer system that was allowed during the first VPN session, and an amount of network traffic by the computer system that was blocked during the first VPN session.

8. The method of claim 1, wherein the properties of the first VPN session further comprise:
a rate at which network traffic by the computer system was allowed during the first VPN session, and
a rate at which network traffic by the computer system was blocked during the first VPN session.

9. The method of claim 1, wherein the properties of the first VPN session further comprise:
a time duration of the first VPN session.

10. The method of claim 1, wherein the properties of the first VPN session further comprise:
an upload transmission rate by the computer system during the first VPN session, and
a download transmission rate by the computer system during the first VPN session.

11. The method of claim 1, wherein the properties of the first VPN session further comprise:
an amount of data uploaded by the computer system during the first VPN session, and
an amount of data downloaded by the computer system during the first VPN session.

12. The method of claim 1, further comprising training the computerized neural network based on second data indicating of a plurality of properties of additional VPN sessions on the communications network.

13. The method of claim 12, wherein training the computerized neural network comprises generating one or more data vectors based on the second data, and wherein the computerized neural network is trained based on the one or more data vectors.

14. The method of claim 1, wherein the first data is obtained by the one or more processors subsequent to a termination of the VPN session.

15. The method of claim 12, wherein the second data comprises, for each of the additional VPN sessions, an indication whether that additional VPN was associated with a malicious activity.

16. The method of claim 12, wherein the computerized neural network is selected from among a plurality of candidate computerized neural networks based on a data size of the second data.

17. The method of claim 12, wherein training the computerized neural network comprises processing the second data using or more autoencoders.

18. The method of claim 17, wherein the one or more autoencoders comprise at least one of:
a sparse autoencoder,
a denoising autoencoder,
a contractive autoencoder, or
a variational autoencoder.

19. A system comprising:
one or more processors; and
one or more non-transitory computer readable media storing instructions that, when executed by the one or more processors, cause the one or more processors to perform operations comprising:
obtaining first data indicating a plurality of properties of a first virtual private network (VPN) session by a computer system on a communications network, wherein the properties of the first VPN session comprise at least one of:
a number of allowed connection attempts by the computer system to each of a plurality of first subnets of the communications network during the first VPN session,
a number of blocked connection attempts by the computer system to each of a plurality of second subnets of the communications network during the first VPN session,
a number of allowed connection attempts by the computer system using each of a plurality of first network ports during the first VPN session, and
a number of blocked connection attempts by the computer system using each of a plurality of second network ports during the first VPN session;
determining, using a computerized neural network implemented, a metric for the first VPN session based on the first data, wherein the metric represents an estimated likelihood that the first VPN session is associated with a malicious activity; and
controlling the first VPN session based on the metric.

20. One or more non-transitory computer readable media storing instructions that, when executed by one or more processors, cause the one or more processors to perform operations comprising:
obtaining first data indicating a plurality of properties of a first virtual private network (VPN) session by a computer system on a communications network, wherein the properties of the first VPN session comprise at least one of:
a number of allowed connection attempts by the computer system to each of a plurality of that first subnets of the communications network during the first VPN session,
a number of blocked connection attempts by the computer system to each of a plurality of second subnets of the communications network during the first VPN session,
a number of allowed connection attempts by the computer system using each of a plurality of first network ports during the first VPN session, and
a number of blocked connection attempts by the computer system using each of a plurality of second network ports during the first VPN session;
determining, using a computerized neural network implemented, a metric for the first VPN session based on the first data, wherein the metric represents an estimated likelihood that the first VPN session is associated with a malicious activity; and
controlling the first VPN session based on the metric.

* * * * *